(12) United States Patent
Mody et al.

(10) Patent No.: US 10,513,566 B2
(45) Date of Patent: Dec. 24, 2019

(54) EPOXIDIZED OIL AND RESIN COMPOSITIONS

(71) Applicant: ACS Technical Products, Inc., Griffith, IN (US)

(72) Inventors: Kamlesh G. Mody, Chicago, IL (US); George R. Murphy, Crown Point, IN (US)

(73) Assignee: ACS Technical Products, Inc., Griffith, IN (US)

( * ) Notice: Subject to any disclaimer, the term of this patent is extended or adjusted under 35 U.S.C. 154(b) by 0 days.

(21) Appl. No.: 16/014,781

(22) Filed: Jun. 21, 2018

(65) Prior Publication Data

US 2018/0371118 A1 Dec. 27, 2018

Related U.S. Application Data

(60) Provisional application No. 62/523,350, filed on Jun. 22, 2017.

(51) Int. Cl.

| | | |
|---|---|---|
| *C08F 8/08* | (2006.01) | |
| *C08L 63/08* | (2006.01) | |
| *C08J 3/24* | (2006.01) | |
| *C08F 20/08* | (2006.01) | |
| *C08F 20/18* | (2006.01) | |
| *C08F 36/06* | (2006.01) | |
| *C08F 20/04* | (2006.01) | |
| *C08G 59/42* | (2006.01) | |
| *C08G 59/02* | (2006.01) | |
| *C08L 33/06* | (2006.01) | |

(52) U.S. Cl.
CPC .............. *C08F 8/08* (2013.01); *C08F 20/04* (2013.01); *C08F 20/08* (2013.01); *C08F 20/18* (2013.01); *C08F 36/06* (2013.01); *C08G 59/027* (2013.01); *C08G 59/42* (2013.01); *C08J 3/24* (2013.01); *C08L 33/066* (2013.01); *C08L 63/08* (2013.01); *C08F 2500/02* (2013.01); *C08J 2400/24* (2013.01); *C08L 2312/00* (2013.01)

(58) Field of Classification Search
CPC .......... C08L 63/00; C08L 63/10; B29C 70/12; C08F 299/0478; C08F 299/065; C08F 22/04; C08K 7/14
USPC .......................... 523/400; 524/522; 525/116
See application file for complete search history.

(56) References Cited

U.S. PATENT DOCUMENTS

| | | | |
|---|---|---|---|
| 3,006,936 A | 10/1961 | Findley et al. | |
| 3,207,718 A * | 9/1965 | Zimmerman | ............. C08F 8/00 156/330 |
| 3,305,514 A * | 2/1967 | Tiffan | ............. B29C 70/12 523/400 |
| 4,461,857 A | 7/1984 | Sekmakas et al. | |
| 4,542,192 A * | 9/1985 | Kraft | ............. C08G 59/4246 525/121 |
| 6,194,490 B1 | 2/2001 | Roth et al. | |
| 6,476,100 B2 | 11/2002 | Diao et al. | |
| 9,199,415 B2 | 12/2015 | Toncelli | |
| 2003/0088007 A1 | 5/2003 | Wool et al. | |
| 2003/0220460 A1 | 11/2003 | Merfeld | |
| 2004/0192859 A1 | 9/2004 | Parker et al. | |
| 2006/0258248 A1 | 11/2006 | Shooshtari et al. | |
| 2008/0125567 A1 | 5/2008 | Ramaraju et al. | |

FOREIGN PATENT DOCUMENTS

| | | |
|---|---|---|
| DE | 102010040601 A9 | 7/2011 |
| EP | 0638621 A1 | 2/1995 |
| EP | 0600546 B1 | 4/1999 |
| EP | 3020691 A2 | 5/2016 |
| JE | 102010040601 A9 | 7/2011 |
| WO | 2013042019 A1 | 3/2013 |
| WO | 2014075182 A1 | 5/2014 |

OTHER PUBLICATIONS

Werner et al, Catalysis of the Epoxy-Carboxyl Reaction, presented at the International Waterborne, High-Solids and Powder Coatings Symposium, Feb. 21-23, 2001, New Orleans, LA USA, pp. 1-18.
Sep. 7, 2018—(WO) International Search Report and Written Opinion—App PCT/US2018/038811.
Tan S.G. et al., "Interpenetrating polymer network structured thermosets prepared from epoxidized soybean oil/diglycidly ether of bisphenol A", Polymer International 2013, vol. 63, issue 2, pp. 273-279.

* cited by examiner

*Primary Examiner* — William K Cheung

(74) *Attorney, Agent, or Firm* — Banner & Witcoff, Ltd.

(57) ABSTRACT

In some aspects, the disclosure relates to thermoset polymeric compositions consisting of functional bio-based epoxies and/or their derivatives (e.g. epoxidized vegetable oil(s)), along with carboxyl functional acrylics and/or polyesters. When cured, example compositions yield high performance products suitable for composite, coating, adhesive, sealant, and/or elastomer applications. When used in stone composite formulations with suitable fillers like quartz and titanium dioxide, example products have high hardness, very low water absorption, and high mechanical strength along with stain, chemical, and heat resistance. When used in coating formulations, example cured films have excellent adhesion, high gloss, clarity, toughness, low water absorption, solvent and chemical resistance, flexibility, and impact resistance without compromising hardness. Coating formulation properties may also include exterior durability. The composition properties may be selectively modified to hard, soft, tough, or elastomeric by selecting the appropriate stoichiometry and type of functional resin to react with epoxy(ies)/derivative(s).

26 Claims, No Drawings

EPOXIDIZED OIL AND RESIN COMPOSITIONS

RELATED APPLICATIONS

The present application is a non-provisional application of U.S. Provisional Application No. 62/523,350, filed Jun. 22, 2017. The content of this application is incorporated herein by reference in its entirety for all purposes.

TECHNICAL FIELD

In some aspects, this disclosure relates to compositions including one or more epoxidized oils or derivatives thereof, such as epoxidized vegetable oil (e.g. linseed and/or soybean oil), and including one or more resins having carboxyl or anhydride functionality, such as acrylic, polyester, and/or polybutadiene resins including carboxylic acid functional group(s). The compositions may be used in a variety of applications, including use and/or incorporation in binder systems (for, e.g. composites), composites, coatings, adhesives, and elastomers.

BACKGROUND

Oil based stone composites using anhydride containing compounds suffer from toxicity, discoloration, or hardness issues. For example, methylhexahydrophthalic anhydride is considered a health hazard even at low levels. Other anhydrides darken the final composite product and may cure non-uniformly due to their solid states.

Example stone composite fabrication processes involve low molecular weight polyester with unsaturated moieties mixed with styrene monomer as a reactive diluent, heated in the presence of suitable catalysts (e.g. a free radical initiator), where the excess unreacted styrene has to be removed from the system. As another example process, copolymers of methyl methacrylate oligomers are used as a binder in the presence of a reactive diluent like methyl methacrylate monomer, where the system is cured in the presence of free radicals generating peroxide initiators at high temperatures to make a hard composite product. In both of these examples and other process, the excess unreacted diluent has to be removed from the system. These reactive diluents are both highly toxic and flammable, and therefore create a hazardous work environment. As another example, enclosed and self-contained equipment to properly handle vapors from acrylic and styrene monomers is capital intensive in addition to its toxicity concerns for workers.

Various epoxidized materials are known (e.g. Bisphenol based epoxies), but these have limited environmental resistance and tend to chalk and yellow over time. What's more, the raw materials used to manufacture these chemicals are environmentally detrimental.

SUMMARY

This Summary provides an introduction to some general concepts relating to this disclosure in a simplified form, where the general concepts are further described below in the Detailed Description. This Summary is not intended to identify key features or essential features of the disclosure.

In some aspects, the disclosure relates to compositions such as composites, adhesives, solvent based coatings and aqueous based coatings, powder coatings, and elastomers. Examples of the compositions, e.g., composites, include an epoxy material(s). The epoxy material may include one or more epoxidized oils (and/or derivatives thereof, such as fatty acid derivatives thereof). The epoxy material may have an oxirane percentage between about 3.0 and about 11.5. The composition may also include one or more resin materials including carboxylic or anhydride functionality. The resin material may have an acid value of about 40 to about 700. In some examples, the one or more epoxidized oils include vegetable oil(s), such as linseed oil, soybean oil, or a combination thereof. In certain embodiments, the one or more epoxidized oils are derived from one or more plant-based raw materials.

In certain examples, the resin material(s) comprise an acrylic resin, a polyester resin, or a combination thereof. In various examples, the resin material comprises a carboxylic or anhydride functional acrylic, a polyester with free reactive carboxylic groups, or a combination thereof. In some examples, the resin material comprises a molecular weight in the range of 500-25,000 Daltons. In certain embodiments the resin material may have a ratio of oxirane to carboxylic groups of about 0.9 to about 1.5. The resin material(s) may have a Tg of about 30° C. to about 90° C. In some examples, the composition is cured using one or more catalysts. In certain examples, the composition is thermally cured at a temperature of about 50° C. to about 300° C.

In some embodiments, the composition, e.g., composite, further includes one or more fillers, such as quartz granules, marble granules, carbon materials such as carbon fibers and/or carbon tubes, glass or glass fibers, silica, ceramic, or a combination thereof. In certain examples, the fillers have a size range of about 0.2-500 µm, or about 10-200 µm.

In some examples, the compositions are powdered compositions, and may be coated onto a substrate and then cured. The powder may a particle size of about 10-200 µm. In certain embodiments, the epoxy material(s) and the resin material(s) are dissolved in an organic solvent to form a liquid coating. In some examples, the epoxy material(s) and the resin material(s) are dispersed in water to form an aqueous coating dispersion. In various embodiments, the dispersion includes a stabilizing component, where this component includes one or more inorganic bases of ammonia, sodium hydroxide, potassium hydroxide, one or more organic bases of triethylamime, dimethylethanol amine, one or more Lewis bases, one or more anionic surfactants, one or more nonionic surfactants, or a combination thereof. In some examples, the composition is a pigmented or clear liquid coating. In certain embodiments, a liquid coating composition is applied to one or more metal, wood, glass, and/or plastic substrates. In various examples, the one or more oils and one or more resin materials are cured into a hard, durable composite. In some embodiments, the composition is applied to one or more substrates in either liquid or paste form, and the one or more substrates are then joined to another substrate, and the joined substrates are heat cured, such that the composition has an adhesive strength sufficient to adhere the substrates together.

In some examples, the one or more epoxidized oils are between about 10-70% of the composite, by weight, between about 10-50%, between about 15-45%, or between about 35%-45%, but other weights and ratios may be used. In certain embodiments, the composition includes an epoxy material combined with an anhydride or carboxyl functional polybutadiene having a molecular weight of 500 to 10,000 Daltons.

In certain embodiments, the composite has a Barcol Hardness of about 70 BU-80 BU. In some examples, the composite has a Barcol Hardness of about 70 BU or more, or about 80 BU or more.

In various embodiments, the composite also includes one or more UV stabilizers, one or more thixotropic binders, or a combination thereof. In certain examples, the epoxy material is derivatized by partially reacting the oxirane functionality with poly carboxyl functional oligomers, polyacid compounds, or a combination thereof. In some embodiments, the epoxy material is partially or fully acrylated, the composition includes a liquid poly unsaturated multifunctional acrylate or vinylic compound, and the composition is cured by a thermally initiated curing process using a peroxide initiator.

In some examples, one or more processing aids are used in the formation of the composition, where, the one or more processing aids may include one or more solvents. In various examples, the compositions are solvent-free. In some embodiments, the amount of bio-renewable content of the composition is 20% or more, by weight. In various examples, when the composition is applied to one or more substrates, it has an adhesive strength sufficient to maintain adhesion to the one or more substrates when exposed to forces up to 1750 psi, or more. In some examples, the composition comprises an amount of amino resins that is less than or equal to the epoxy equivalent levels. In certain examples, the composition includes a polyisocyanate material, a blocked polyisocyanate material, an isocyanate blocked prepolymer material, an isocyanate terminated prepolymer material, or a combination thereof.

In some examples, the composition has a flexural strength of 7000 psi or more. In various embodiments, the composition has a twenty-four hour water absorption rate of 0.03% or less. In some examples, the composite has a flexural strength of 7000 psi or more and a Barcol Hardness of 70 BU or more.

In accordance with another aspect of the disclosure, processes are disclosed. In some examples, the process includes combining and heating an epoxy material and a resin material, for example above the glass transition temperature of the resin material and curing the mixture. The epoxy material may include one or more epoxidized vegetable oils, one or more epoxidized vegetable oil derivatives, or a combination thereof. The epoxy material may have an oxirane percentage between about 3.0 and about 11.5. In some examples, the resin material includes carboxylic or anhydride functionality. In some examples, the resin material has an acid value in a range of 40-700. In certain examples, the resin material includes an acrylic resin, a polyester resin, or a combination thereof, or may include one or more acrylic resins, one or more polyester resins, or a combination thereof. In some examples, the resin material may include other materials. In various embodiments, the resin material includes carboxylic or anhydride functional acrylic, a polyester with free reactive carboxylic groups, or a combination thereof. In certain examples of the processes, one or more fillers are mixed with the epoxy material and the resin material.

In certain examples, the process includes heating one or more epoxidized oils and one or more resin materials including carboxylic functionality above the glass transition temperature of the one or more resin materials, and mixing the heated one or more oils and one or more materials to form a mixture. Then, the mixture may then be cured to form a composite. In certain examples, one or more fillers are also heated and mixed with the one or more oils and one or more materials, or added to a formed mixture. In various embodiments, one or more solvents are also heated and mixed with the one or more oils and one or more materials.

These summary descriptions merely provide examples of materials, compositions, systems, composites, processes and/or process steps that may be performed in one or more embodiments. In certain embodiments, materials and methods include additional combinations or substitutions. To that end, other details and features will be described in the sections that follow. Any of the features discussed in the embodiments of one aspect may be features of embodiments of any other aspect discussed herein. Moreover, additional and alternative suitable variations, features, aspects and steps will be recognized by those skilled in the art given the benefit of this disclosure.

These and other features, advantages, and objects of the present disclosure will be further understood and appreciated by those skilled in the art by reference to the following specification.

DETAILED DESCRIPTION

The examples, materials and methods of described herein provide, inter alia, materials, compositions, composites, and/or binder systems, and processes of making the same. These and other aspects, features and advantages of the disclosure or of certain embodiments of the disclosure will be further understood by those skilled in the art from the following description of example embodiments. It is to be understood that other modifications may be made from the specifically described methods and systems without departing from the scope of the present disclosure. It is also to be understood that the specific materials, systems, and described in the following specification, are simply example embodiments. Hence, specific amounts and other physical characteristics relating to the embodiments disclosed herein are not to be considered as limiting.

In some aspects, the disclosure relates to composites or systems utilizing one or more composites. For example, in certain applications, a thermoset epoxy-based binder system is provided for stone composite applications (but other applications such as coatings or adhesives are possible, as described below, where in some example applications the thermoset material is not set until one or more substrates are coated, joined together, or other pre-setting actions are completed, and in some examples are non-binder systems). In some examples, a composite includes an epoxy material that includes one or more epoxidized oils and one or more resin materials that include carboxylic and/or anhydride functionality. In certain examples, other materials, such as coatings, include the one or more epoxidized oils and one or more resin materials including, e.g., carboxylic functionality.

In certain examples, the one or more epoxidized oils are derived from one or more plant based raw materials. The oils may include one or more of linseed oil, soybean oil, or another vegetable oil (e.g. sunflower oil, safflower oil, or others). Other example oils may include one or more of olive oil, sesame oil, sunflower seed oil, corn germ oil, palm oil, and rapeseed oil. The epoxidized oils may include or consist of a derivative of any of the above example oils (such as an ester derivative), or other suitable oils such as plant-based oils. While certain specific examples of this disclosure recite particular type of oil, such as linseed, soybean or may simply refer to a vegetable oil, other oils maybe be substituted for this specifically recited oil to provide other example compositions of this disclosure, or may be combined with the recited oil(s). In some examples, a variety a vegetable oils are used together (e.g. soybean and linseed). The epoxidized oils of this disclosure (or their derivatives) may be non-toxic, nonvolatile reactive liquids made from sustainable plant-based raw materials, and therefore provide several advantages in the production, acquisition, refining, and/or use of the materials used in the composition.

The epoxidized oil(s) may be non-volatile and/or non-ionic. The oils may contain compounds having C5-C26 aliphatic chains (but may also contain carbon chain(s) of other length), which may have linear and/or branched aliphatic groups. In some examples, the oxirane/epoxide oxygen content is about 3% or more (by weight) of the oil(s). In some examples, it is about 5% or more, 7% or more, about 9% or more, about 11% or more, about 13% or more, or about 15% or more. In some examples, the oxirane/epoxide content is about 2.0-14% by weight, about 3.0-11.5% by weight, about 5-10% by weight, about 6.5-9.5%, about 6.5-7.5%, about 7.0-7.5%, about 8.5-9.5%, or about 9.0-9.5%. This can provide a high reactivity of the oil through the number of oxirane/epoxide functionality sites on the oil molecules. As a specific example, an epoxidized linseed oil with relatively high oxirane content (e.g., about 9% minimum) contains approximately 5 epoxide reaction sites and 3 ester sites per molecule, and averages about 5.5 epoxide groups per epoxidized molecule. Thus, each oil molecule in this example is capable of reacting with an average of five and a half equivalents of an acid, such as a carboxylic acid. As another specific example, use of epoxidized soybean oil with oxirane content of about 7% or more provides an average of 4.5 reactive groups per molecule. Oils with a higher degree of epoxidation may yield a harder product, that will require relatively smaller amounts of oil, because the expoisized oil has a relatively higher degree of functionality. As one example, a High IV Epoxidized Linseed Oil with an oxirane content of about 10.7 or greater may be used; this yields a harder product that requires less ELO because it has higher functionality. In some examples, the epoxy material is derivatized by partially reacting the oxirane functionality with poly carboxyl functional oligomers, polyacid compounds, or a combination thereof. In some examples, the epoxy material is partially or fully acrylated. In various examples, the composition also includes a liquid poly unsaturated multifunctional acrylate or vinylic compound.

In some examples, the epoxidized oils have a molecular weight ranging from about 100-30,000 Daltons, about 100-20,000 Daltons, about 500-25,000 Daltons, about 5,000-15,000 Daltons, about 7,000-13,000 Daltons, or about 9,000-11,000 Daltons. In some examples, the composition also include an anhydride or carboxyl functional polybutadiene having a molecular weight of 500 to 10,000 Daltons, or 1,000 to 5,000 Daltons, for example in combination with an epoxy material. In various examples the resin materials have a molecular weight of about 200 Daltons or more, about 500 Daltons or more, about 1,000 Daltons or more, about 5,000 Daltons or more, about 12,000 Daltons or more, or about 20,000 Daltons or more. In certain examples, the resin materials have a molecular weight of about 15,000 Daltons or less, about 5,000 Daltons or less, about 1,000 Daltons or less, or about 500 Daltons or less.

In various examples, the one or more resin materials include one or more of an acrylic resin, a polyester resin, a polyurethane resin or a combination thereof. In at least the composite and/or binder system applications of the present disclosure, the resin or resins should be curable compounds compatible with the epoxidized oil. The resin(s) may have a high glass transition temperature (Tg). In some examples, the materials have a Tg of about 25 degrees Celsius or more, about 30 degrees Celsius or more, about 50 degrees Celsius or more, about 60 degrees Celsius or more, or about 70 degrees Celsius or more. In various examples, the one or more resin materials have a Tg between about 20-100 degrees Celsius, about 30-90 degrees Celsius, 40-80 degrees Celsius, about 50-70 degrees Celsius, about 50-60 degrees Celsius, or about 50-100 degrees Celsius. The resin may initially be present as a solid, e.g. as powdered, flakes, granules, or a combination thereof. In some examples, the resin is or includes a carboxylic or anhydride functional acrylic. In some examples, the resin is or includes a polyester with free reactive carboxylic groups. The epoxy and resin material(s) may have ratio of oxirane to carboxylic groups of about 0.9-1.5. In other examples, the ratio is about 0.5-2.0. In some examples, the ratio is about 0.5 or more, about 0.9 or more, about 1.1 or more, about 1.3 or more, about 1.5 or more, about 1.7 or more, or about 1.9 or more.

In some examples, such as those for binder compositions for a composite or a liquid coating, an epoxidized oil or oils (such as epoxidized vegetable oil or its derivatives) react with one or more resins and/or molecules having carboxylic or hydroxyl functionality, or both. The reaction of the epoxy group with the acid can generate a hydroxyl group, while the hydroxyl group can react with the epoxy group to generate ether linkages. Alternatively, the epoxy group may react with methylol groups, melamine resins, and/or isocyanate groups. Examples of carboxyl functional resins with a high amount of reactable free acid or acid generating groups include a polyacrylate, polyester or carboxyl-terminated butadiene-acrylonitrile (CTBN) resin. Acid generating anhydride based systems can also be used, e.g. maleic anhydride grafted polybutadiene. There may also be a small amount of reactive diluent that can be a derivative of the epoxidized oil, e.g. epoxidized methyl linseedate.

In some examples, one or more polyacrylic resins are used for, e.g. a binder composition or other application. The polyacrylic resin (or resins) may include copolymers of carboxylic group containing moieties that can react with epoxy groups, such as meth(acrylic acid), and/or hydroxyl groups like hydroxyl ethyl meth(acrylate). In some examples, the polyacrylic resin (or resins) may include monomers, such as methyl methacrylate, glycidyl methacrylate, and/or even vinyl based monomers, like styrene, to increase Tg and improve hardness. In certain embodiments, the polyacrylic resin (or resins) may include butyl meth (acrylate) to improve flexibility and/or compatibility. In some examples, an acrylate resin material may include glycidyl methacrylate based acrylates, where the carboxylic acrylate material may react with the epoxidized oil (e.g. an ELO materials) as well as the glycidyl methacrylate acrylate.

In some examples, a polyester resin is used for e.g. a binder composition or other application. In certain examples, compositions may include one or more polyester resins with excess carboxylic groups, where these may result from the reaction between poly carboxylic acid and poly hydroxyl molecules with a molar excess of the poly acids, in the presence of a suitable catalyst. There are numerous polyacids suitable or these embodiments, including but not limited to cyclohexane dicarboxylic acid, adipic acid, citric acid, succinic acid maleic acid, lactic acid, sebacic acid, aromatic polyacids such as but not limited to isophthalic acid, terephthalic acid, phthalic acid, and/or one or more anhydrides such as but not limited to trimellitic anhydride and/or phthalic anhydride. In certain examples, polyols may be used to react with the polyacid(s) to generate the ester linkages, such as neopentyl glycol, 1, 4 butane diol, 1, 6 hexane diol, trimethylolpropane, and/or trimethylolethane.

Using, for example, an acrylic resin and/or a polyester resin in powder form along with an epoxidized oil or oils, such as epoxidized linseed oil, as the liquid plasticizer helps suspend the resin in the oil and lower the operational viscosity of the resin system. This may facilitate mixing, dispersion, and ultimate formation of, e.g. a cured composite material. In some examples, the one or more epoxidized oils are between about 10-70% of the composite (or, in other embodiments, other compositions such as coatings), by weight, between about 10-50%, between about 15-45%, or between about 35%-45%.

The resin material(s) may include oligomeric resins. In some examples, the amount of amino resins is less than or equal to the epoxy equivalent levels. In some examples, the composition includes a polyisocyanate material, a blocked polyisocyanate material, an isocyanate blocked prepolymer material, an isocyanate terminated prepolymer material, or a combination of the same and/or multiple materials in these categories.

In some examples, the resin materials have a molecular weight ranging from about 600-15,000 Daltons, about 1,000-20,000 Daltons, about 1,500-11,000 Daltons, or about 5,000-15,000 Daltons. In various examples the resin materials have a molecular weight of about 1500 Daltons or more, about 4,000 Daltons or more, about 10,000 Daltons or more, or about 15,000 Daltons or more. In certain examples the resin materials have a molecular weight of about 15,000 Daltons or less, about 10,000 Daltons or less, about 5,000 Daltons or less, or about 2,000 Daltons or less. Aqueous based systems may use materials reaching 25,000 to 50,000 Daltons, or even greater values. In case of water based applications the molecular weight of the carboxyl functional latex can be 50,000 Daltons or more, 75.000 or more, or 100,000 or more.

In certain composition examples, the one or more epoxidized oils are between about 10-70%, by weight, of the total combined weight of the epoxidized oil(s) and the resin material(s), between about 10-50%, between about 15-45%, between about 35-45%, or between about 40-80%. In some examples, the epoxidized oil(s) (and/or derivatives) are 10% by weight or more, 20% or more, 30% or more, 40% or more, 50% or more, 60% or more or 70% or more. These weight ranges or values of oil(s) (or derivatives) may also be used based on the entire composition weight, for example, in a composition including oil(s), resin material(s), and one or more additives, such as a filler. In certain examples, thus, the one or more epoxidized oils are between about 10-70%, by weight, of the entire composition weight. In various embodiments, the one or more epoxidized oils are between about 15-60%, by weight, of the entire composition weight, about 20-25% by weight, about 10-25% by weight, about 30-50% by weight, or about 20-45% by weight. In certain composition embodiments, the resin material(s) are the only other ingredients, while in others one or more additional ingredients are present.

In some embodiments, the resin material, such as a polyester or acrylic resin, includes carboxylic functionality. The epoxide group in the oil(s) may then react with the carboxylic acid functionality to form neutral compounds, i.e. the epoxide ring opens in the presence of the carboxylic acid group to form neutral esters of the acid present. In certain composition examples, the one or more resin materials are between about 20-90%, by weight, of the total combined weight of the epoxidized oil(s) and the resin material(s), between about 20-60%, between about 35-55%, between about 40-50%, between about 45-60%, or between about 20-35%. In some examples, the resin materials(s) are 50% by weight or more, 10% or more, 20% or more, 30% or more, 40% or more, 50% or more, 60% or more or 70% or more. In certain composition embodiments, the resin material(s) are the only other ingredients, while in others one or more additional ingredients are present. These weight ranges or values of resins materials may also be used based on the entire composition weight, for example, in a composition including oil(s), resin material(s), and one or more additives, such as a filler or fillers. In certain examples, thus, the one or more resin materials are between about 20-60%, by weight, of the entire composition weight. In various embodiments, the one or more epoxidized oils are between about 20-30%, by weight, of the entire composition weight, about 45-60% by weight, about 35-50%, or about 20-35% by weight.

In some embodiments, the composite further includes one or more fillers and/or additives, such as quartz, marble, or a combination thereof. The fillers may be granules appropriately sized for the application and desired properties. In some examples, the fillers and/or additives include one or more of mineral fillers, metal fillers (and/or metallic alloy fillers), granite fillers, ceramic fillers, various fibers including carbon fibers, carbon nanotubes, one or more conductive materials, and/or decorative elements such as pigments, pigmented/colored materials, dyes, or decorative elements such as metal flakes. In some examples, the fillers may be or include one or more inorganic fillers, such as alumina trihydrate, calcium carbonate, titanium dioxide, or other compounds including one or more alkali metals, alkali earth metals, or transition metals. Various ligands may be coordinated with an appropriate filler metal material. In certain examples, the fillers have a size range of about 0.2-500 µm, about 100-500 µm, about 1-10 µm, about 1-100 µm, about 100-500 µm, about 100-1000 µm, about 0.1-0.5 µm, about 0.1-0.2 µm, about 0.2-1 µm or about 0.2-0.5 µm. In some examples, the one or more fillers may be present in an amount of about 30% or more by weight of the entire composition. In certain examples, the one or more fillers may be about 50% or more by weight of the entire composition, about 60% or more, about 70% or more, about 80% or more, about 90% or more, or about 95% or more. In various embodiments, the weight ratio of a binder (including epoxidized oil(s) and resin(s) material) to one or more fillers is about 1:3 or more, about 1:5 or more, about 1:8 or more, about 1:9 or more, or about 1:10 or more.

In various examples, the one or more oils and one or more resin materials are cured into a hard, durable composite. Example compositions may include acrylic and/or polyester resins with carboxylic functionality and having high glass transition temperature (Tg) that are blended with one or more epoxidized oils, such as linseed or vegetable oil and/or their derivatives, in suitable molar ratios along with fillers such as quartz to make composites. These and other composites (e.g. those without fillers) may have high Barcol Hardness, impact resistance, and/or chemical, water and UV resistance. The cured material and/or binder may have high gloss as well as clarity. Cure temperatures may be from 50° C. to about 300° C., and various cure times and conditions may be used depending on the characteristics of the composition and desired cure characteristics. Prior to curing, the composition may be mixed, intermittingly or continuously, for example for one hour. In some examples, the mixtures are allowed to sit prior to curing after mixing. Compositions may be partially or completely dried prior to curing.

In some examples, the composition is heated above the Tg of the carboxylic functional resin along with an epoxidized linseed oil ("ELO"). The ELO and/or other epoxidized oil (or derivative) may act as a reactive, nonvolatile diluent to assist in uniformly wetting the particle surface and compaction of any binder filler (such as quartz granules of size range of 0.2-500 μm). After the composition is uniformly mixed and settled, the temperature may be raised to 140° C. (or other appropriate temperature) to cure the oil(s) with the carboxylic functionality resin to form a hard durable chemically and thermally resistant composite. The relatively high functionality of the epoxidized oils may result in a harder cured product by allowing the stoichiometry to balance such that relatively lower amounts of oil are needed. The final product may have a non-hazy appearance, non-yellowed and/or non-colored appearance (unless desired and achieved through intentional colorants such as added filler materials), be stable (e.g. not crystallize at room temperature) and cure relatively quickly.

There are a number of advantages that result from the use of epoxidized oils. For example, ELO and other epoxidized oils of this disclosure have built in aliphatic chains resulting in a composite with excellent impact resistance, as opposed to conventional Bisphenol A type epoxies that inherently tend to have poor impact resistance due to the presence of aromatic groups (and thus often had to be formulated with aliphatic compounds to improve these properties). Additionally, the reaction of the oxirane groups with carboxylic groups generates hydroxyl groups giving excellent adhesion to polar surfaces and fillers. Meanwhile, the long aliphatic moieties give excellent water resistance as well as resistance to polar solvents. Finally, the high percentage of oxirane groups gives a dense cured network without compromising toughness. The virtual absence of unsaturation in, e.g., ELO also provides a way to formulate non-yellowing compositions. Its incorporation gives strong adhesion due to the opening of the oxirane ring, good hydrophobicity, as well as chemical and stain resistance. Other appropriate oils or derivatives can similarly provide some or all of these benefits, as illustrated herein. In particular, the level of hardness, degree of curing, and overall compatibility of the epoxidized oils with the various resins was surprising and unexpected. It was unexpectedly determined that ELO, for example, cures with certain acids with relatively short gel times (e.g. <15 min) at elevated temperatures (e.g. 145 degrees Celsius), and had desirable chemical properties. In certain examples, the oil(s) and resin(s) materials may have gel times of about 30 minutes or less, about 20 minutes or less, about 15 minutes or less, or about 10 minutes or less.

As an example, compositions utilizing the epoxidized oils and resins may have high Barcol Hardness and impact resistance, along with chemical, water and ultraviolet resistance. The exterior resistance can be further enhanced by formulating with additives, such as hindered amines (HALS) and/or UV stabilizers. Example compositions may also be used for coating and structural adhesive applications, for example as an alternative to Bisphenol A based epoxies or in formaldehyde free coating applications as a replacement for amino curing agents.

Therefore, the present disclosure provides high performance, non-toxic example products that are also beneficially made from sustainable raw materials. This can be advantageous to the ultimate users of the products, e.g., by facilitating the acquisition of LEED (Leadership in Energy and Environmental Design) certifications, which are highly desirable in commercial and residential construction.

In certain embodiments, the composite has a Barcol Hardness of about 70 BU-80 BU, in others about 65-70, in others about 70-75, in others about 75-80, and in others about 80-85. In some examples, a composite has a Barcol Hardness of about 60 BU or more, about 70 BU or more, or about 80 BU or more. In various embodiments, the composite also includes one or more UV stabilizers, one or more thixotropic binders (i.e. materials that become less viscous under applied stress), or a combination thereof. In certain examples, the materials and/or composites may utilize or incorporate one or more processing aids. In some examples, the one or more processing aids include one or more solvents.

In accordance with another aspect of the disclosure, processes are disclosed. In some examples, the process includes heating one or more epoxidized oils and one or more resin materials including carboxylic functionality, and mixing the heated one or more oils and one or more materials to form a mixture. In some examples, the materials are heated above the glass transition temperature of the one or more resin materials with carboxyl functionality, where the epoxidized oil(s) (such as epoxidized linseed oil), acts as a reactive nonvolatile diluent. In certain examples, one or more fillers are also heated and mixed with the one or more oils and one or more materials. When the oil(s) act as a reactive nonvolatile diluent, this can assist in uniformly mixing and compacting and bind any fillers that are added (such as, but not limited to, quartz granules, e.g. having a size range of about 0.1-500 micrometers). Then, in some examples, the mixture is cured to form a composite. For example, the composition may be uniformly mixed and settled and then the temperature is raised to 140 degrees C. to cure the, e.g., epoxidized linseed oil (or other cure temperatures as appropriate based on the oil(s) used) with the carboxylic functionality of the resin to form a hard durable chemically and thermally resistant composite. Thus, the epoxidized oils (such as ELO) and their derivatives may be used in, e.g., powder resin applications, or at higher levels as epoxy blends for chip and impact resistant exterior or interior heat cured coating applications. In various embodiments, one or more solvents are also heated and mixed with the one or more oils and one or more materials, and optionally any fillers, or the fillers may be subsequently added.

In some embodiments, the composite is an extrudable material. For example, the composite materials may be mixed at a relatively low temperature (e.g. under 140 degrees Celsius, but a high enough temperature to facilitate mixing as needed based on the materials utilized) and mechanically shaped by, e.g., one or more rollers, then extruded (or molded) through one or more dies, molds, casts, and so on. In some examples, the mixed materials are directly extruded without the, e.g. rollers. The extrusion may be intermittent or continuous. After extrusion, the materials may be cured at an elevated temperature (e.g. above 140 degrees Celsius). A variety of composite shapes, such as sheets of material, may be cured in this manner. These sheets or other shapes may be used in a variety of applications, such as countertops or other structural materials. In some examples, the composite (e.g. a cured sheet) may be further mechanically manipulated under heating to facilitate application, installation, and the like, for example, to fold or reform the profile of the e.g. sheet.

In some examples, the composition is a powder. The powder may have a size of about 10-200 μm. In some examples, the powder size is about 10 μm or more, about 25 μm or more, about 50 μm or more, about 100 μm or more, about 150 μm or more, or about 200 μm or more. The powered composition may be coated onto a substrate or substrates and is then cured, for example as a powder coating application.

In certain examples, the compositions, such as a composite, have a low water absorption rate. In certain examples, the composition, e.g. composite, has a water absorption of 0.03% or less over 24 hours, 0.02 or less, or 0.05% or less. In other examples, the water absorption is 0.2% or less over 24 hours, 0.5% or less, 0.75% or less, 1.0% or less, or 1.5% or less. It is noted that some relatively higher level testing results may be present due to testing equipment limitations. In example testing conditions with more optimized formulations and/or testing equipment, the water absorption may be much lower (or other proprieties may have different, more optimized results)). In some examples, the composition, e.g. a composite, has a water absorption of 0.1% or less over 7 days, 0.05% or less, 0.15% or less, or 0.2% or less.

When utilized as an adhesive, as illustrated below, example compositions may have sufficient mechanical strength that that the compositions maintain structural integrity when exposed to a force of 1000 psi or more, 1200 psi or more, 1500 psi or more, 1750 psi or more, or 2000 psi or more. In some examples, the adhesive strength is greater than the composite strength (in terms of ability to withstand forces). In various embodiments, the example compositions may have sufficient mechanical strength that that the compositions maintain structural integrity when exposed to a forces up to 1000 1200 psi, 1500 psi, 1750 psi, or 2000 psi.

The cured compositions may have a number of desirable properties as described herein. In some examples, the compositions have an adhesion value of 5 A on steel as measured by ASTM D3359. In certain examples, the compositions have an adhesion value of 5 A on phosphated steel as measured by ASTM D3359. In various embodiments, the compositions have an adhesion value of 4-5 A on aluminum as measured by ASTM D3359. In certain examples, the compositions have a hardness value of >6H or 6H as measured by ASTM3363 (on steel). In various examples, the compositions have a MEK Resistance value of about 100 as measured by ASTM 4752 (on steel). In other examples, the compositions have MEK resistance of 150 or more, 175 or more, or 200 or more, as measured by ASTM 4752 (on steel).

In some embodiments, the compositions have a gloss value of about 90 (twenty degree angle), about 94 (sixty degree angle), and/or about 98 (85 degree angle) as measured by ASTM D523 (on aluminum). In certain embodiments, the compositions have a gloss value of about 82 (twenty degrees) about 94 (sixty degrees), and/or about 98 (85 degrees) as measured by ASTM D523 (on aluminum). In various examples, embodiments, the compositions have a gloss value of about 80 or more (twenty degrees), about 90 or more (sixty degrees), and/or about 95 or more (85 degrees) as measured by ASTM D523 (on aluminum). In certain examples, embodiments, the compositions have a gloss value of about 90 or more (twenty degrees), about 94 or more (sixty degrees), and/or about 98 or more (85 degrees) as measured by ASTM D523 (on aluminum). In various examples, the compositions have a chemical resistance value of 5 as measured by ASTM D1308 using 10% sulfuric acid and a steel substrate. In certain embodiments, the compositions have a chemical resistance value of 5 as measured by ASTM D1308 using xylene and a steel substrate. In some examples, the compositions have a chemical resistance value of 5 as measured by ASTM D1308 using isopropyl alcohol and a steel substrate. In various embodiments, the compositions have a chemical resistance value of 5 as measured by ASTM D1308 using water and a steel substrate.

In some embodiments, the compositions pass with a ⅛" value the flexibility by conical mandrel bend testing by ASTM D522 on steel. In various embodiments, the compositions fail at a 6T value the flexibility by t-bend testing by ASTM D4145 on steel. In some examples, the compositions have an impact resistance such that they pass 60 or more direct impacts as tested by ASTM D2794 (on steel), or 70 or more direct impacts. In certain embodiments, the compositions have an impact resistance such that they pass 50 or more reverse impacts as tested by ASTM D2794 (on steel), 60 or more reverse impacts, or 70 or more reverse impacts. Example samples having one or more of the above properties may have a thickness of about 1.0 mils, about 1.1 mils, about 1.2 mils, about 1.3 mils, or about 1.0-1.3 mils.

In some examples, the cured composites have a resistance to sodium hydroxide such that there is no effect after 24 hours of exposure to 10% NaOH or 1N NaOH. In various examples, there is no effect from a marker stain. In some examples, there is no effect on a film after 24 hours of exposure to 2% $H_2SO_4$.

The compositions may be non-hazardous. In some examples, the compositions are solvent-free, such as solvent-free composites. In some examples, the compositions have a high degree of bio-renewable content, such as composite with a high degree of bio-renewable content.

Example Formulations, Applications and Systems

The applications of the oil and resin compositions are numerous, but there may be particular advantages for binder systems, composites such as stone composites, coatings such as powder coatings or liquid coatings, as well as adhesive and/or elastomer applications. The compositions may include one or more fillers such as quartz and/or marble. ELO, for example, along with polymer resins having pendant carboxylic functional groups, for example, may be used as a binder matrix for other composite applications using glass, wood, carbon, or other fibers, fillers and/or additives, both natural and synthetic, including, e.g. conducive materials, carbon nanotubes, and/or carbon fibers. In some examples, the compositions provide liquid coatings that may be applied to one or more metal, wood, glass, or plastic substrates. Such coatings may, for example, have utility in industrial, automotive, appliance coating applications, fiberglass sizing applications, composite laminate applications or other applications, for example through the coating of components, sheets, or coils.

The use of EVO, ESO, ELO, or other natural, plant-based epoxidized oils in the composite resin matrix can offer several advantages including superior hydrolytic stability compared to polyester. Varying the Tg and molar proportions of the resin, e.g. an acrylic and/or polyester resin, it is possible to increase the hardness of the composite. Therefore, in some aspects, the compositions are durable, have beneficial mechanical properties (such as Barcol Hardness of 70 BU or more), and/or chemically resistant surfaces. Through appropriate combinations, the resin(s) may impart desirable characteristics such as hardness, clarity, and/or low color with exterior durability towards UV light and other elements, while the epoxy component(s) may impart desirable characteristics such flexibility/impact properties, improved adhesion, chemical and water resistance, and/or alkali resistance.

To form examples of the compositions of this disclosure, in some embodiments, a mixture of at least one oil and at least one resin material is heated above the Tg of the carboxylic functional resin, where the ELO (and/or other oils(s)) may act as a reactive nonvolatile diluent to assist in uniformly compacting and binding fillers, such as quartz fillers. The liquid plasticizer may help suspend the resin in ELO and lower the operational viscosity of the resin system. The resin softened by ELO may then be used to wet the quartz filler (or other filler(s)) to make a paste-like composition. The process may be assisted by the addition of one or more solvents, such as non-HAPS volatile solvent. The mixture can be dried by removal of the solvent. The dry formulated mixture can conveniently transported, if desired, to various fabrication locations for curing and fabricating the finished product. This mixture may, after being thoroughly blended, be added into a heated mold cavity and progressively compressed, or compressed via vibro-compression vacuum process, during filling and melting. The product may then be compressed in the mold and cured, for example at 150° C. for 60 to 90 minutes, but other temperatures and time ranges may be appropriate based on the materials used, size of the product, and other factors. The optional use of a suitable catalyst (or catalysts) may further lower the cure time and/or temperatures needed. Example catalysts include nitrogen containing catalysts such imidazoles, for example 1-methyl imidazole, or derivatives of toluene sulfonic acid and/or phosphate salts. Other possible catalysts may include hydroxyl compounds, carboxyl compounds, organometallic compounds, alkaline metal compounds, or ammonium or amine compounds. For example, possible catalysts include zinc, titanium, aluminum, and tin organometallic compounds, alkaline metal or ammonium halides, aliphatic and aromatic amines, or other compounds such as boron complexes. In some examples, the composition is cured by a thermally initiated curing process using a peroxide initiator.

Table 1 below provides various example formulations. These examples may be utilized as binder systems, e.g. for stone composites. The systems and/or composites may be solvent based or non-solvent based, as illustrated below. Some of these examples use Epoxol® 9-5 as an example epoxidized linseed oil, which is commercially available from ACS Technical Products. Epoxol® 9-5 is a non-volatile, nonionic, nearly water white polyepoxide with virtually no odor or flavor. Its typical properties include 9.0-9.5% of Oxirane Oxygen, an Iodine Value of 2-5, a Gardener Color of less than 1, a Gardner Viscosity at 25° C. of 880 cps, a Specific Gravity at 25°/25° C. of 1.020. Epoxol® 9-5's ratio of functionality sites per epoxy molecule of 5.5, and a molecular weight of approximately 980 Daltons. Epoxol® 9-5 is soluble in various hydrocarbon solvents, particularly polar hydrocarbon solvents, including acetone or other ketones, alcohols, Carbon tetrachloride, chloroform, trichloroethylene, benzene and other aromatic hydrocarbons, and ethers. It is insoluble in water, hexane, mineral oil, and other aliphatic hydrocarbons. Other linseed oils or other oils may be utilized, however.

Another example oil suitable for use in the formulations and compositions is, as illustrated below in Table 1, is Epoxol® 7-4, an example epoxidized soybean oil, which is commercially available from ACS Technical Products. Epoxol® 7-4 is a non-volatile, nonionic, nearly water white polyepoxide with virtually no odor or flavor. Its typical properties include 7.0-7.5% of Oxirane Oxygen, an Iodine Value of 1-3, a Gardener Color of less than 1, a Gardner Viscosity at 25° C. of 500 cps, a Specific Gravity at 25°/25° C. of 0.995. Epoxol® 7-4's ratio of functionality sites per epoxy molecule of 4.5, and has a molecular weight of approximately 960 Daltons. Epoxol® 7-4 is soluble in various hydrocarbon solvents, particularly polar hydrocarbon solvents, including acetone or other ketones, alcohols, carbon tetrachloride, chloroform, trichloroethylene, benzene and other aromatic hydrocarbons, and ethers. It is insoluble in water, hexane, mineral oil, and other aliphatic hydrocarbons. As illustrated by the example oils, Epoxol® 9-5 contains about 30% more oxirane oxygen than the example epoxidized soybean oil and therefore, about 30% more functionality on an equal weight basis. This, depending on the desired properties of the composite or compositions, can result in greater performance and/or efficiency, as can use of other high oxirane content oils. In other applications, a lower oxirane content may be desirable, however, based on, e.g. the acid content of the resin material(s).

These example formulations also utilize various example acrylic resins. Many other acrylic resins, or other types of resin materials, may be utilized, however. In some examples, the resin material includes one or more solid acrylic resins (e.g. a flake resin), or one or more high acid resins (but low acid resins may also be utilized). Resins with a variety of molecular weight may be used, as described above. In some examples, the resin will have an acid equivalent weight of about 100 or more, about 150 or more, about 200 or more, about 250 or more, about 300 or more, about 350 or more, about 400 or more, about 500 or more, about 600 or more, about 700 or more, about 800 or more, or about 900 or more. In certain embodiments, the acrylic resin having an acid value of about 20 or more, about 35 or more, about 40 or more, about 45 or more, about 50 or more, about 60 or more, about 75 or more, about 100 or more, about 150 or more, about 200 or more, about 225 or more, about 250 or more, about 275 or more, about 300 or more, about 325 or more, about 350 or more, about 375 or more, about 400 or more, about 450 or more, about 500 or more, about 550 or more, about 600 or more, about 650 or more, or about 700 or more. In some examples, the resin acid value is in a range with one of these values as the approximate upper limit, and another lower value may be a approximate lower limit (e.g. 75-375). The resin material may have an acid value of about 35 to about 350, about 40 to about 700, about 40 to 350, about 50 to 350, about 50 to about 300, about 35 to about 100, about 100 to about 250, about 150 to about 225, about 75 to 350, about 100 to about 350, about 200 to about 350, about 75 to about 700, about 75 to 350, about 150 to about 700, about 200 to about 700, about 150 to about 350, about 200 to about 375, or about 150 to about 500.

TABLE 1

| Ingredients | AV | Oxirane Percentage | Tg | Wt | Wt % | Comments |
|---|---|---|---|---|---|---|
| Example Formulation # 1 | | | | | | |
| Acrylic resin | 70 | — | 62 | 40 | 82.5 | Solid Flake Carboxyl Acrylic Resin with an acid equivalent weight of about 800, and a molecular weight of about 10,500 Daltons |

TABLE 1-continued

| Ingredients | AV | Oxirane Percentage | Tg | Wt | Wt % | Comments |
|---|---|---|---|---|---|---|
| Epoxol ® 9-5 | | 9.4 | — | 8.4 | 17.5 | Source: ACS Technical Products |
| Example Formulation # 2 | | | | | | |
| Acrylic resin | 215 | — | 67 | 26.1 | 60.5 | Acidic acrylic resin with an acid equivalent weight of about 260 and a molecular weight of about 4,500 Daltons |
| Epoxol ® 9-5 | | 9.4 | — | 16.8 | 39.5 | Source: ACS Technical Products |
| Example Formulation # 3 | | | | | | |
| Acrylic resin | 238 | — | 56 | 23.6 | 58.1 | Acrylic resin with an acid equivalent weight of about 235, and a molecular weight of about 1,700 Daltons |
| Epoxol ® 9-5 | | 9.4 | — | 16.8 | 41.9 | Source: ACS Technical Products |
| Example Formulation # 4 | | | | | | |
| Acrylic resin | 70 | — | 62 | 40 | 77.6 | Solid Flake Carboxyl Acrylic Resin with an acid equivalent weight of about 800, and a molecular weight of about 10,500 Daltons |
| Epoxol ® 7-4 | | 7.1 | — | 11.41 | 22.4 | Source: ACS Technical Products |

An example formulation of a binder system using partial solvent as a processing aid follows below in Table 2.

TABLE 2

| Ingredients | Amt (g) | Wt % |
|---|---|---|
| Acrylic resin (acid equivalent weight of about 260 and a molecular weight of about 4,500 Daltons) | 39.2 | 58.2 |
| Acetone (solvent) | 28.1 | |
| Epoxol ® 9-5 | 28.8 | 41.8 |
| Total | 96.1 | % NV: 70% |

As one example of a formation process, 11.33 g of the above mixture was placed in a glass jar and 77.5 g of quartz (using Hipu QS 005F commercially available from Gebrüder Dorfner GmbH & Co. as an example quartz material, but other quartz sources or fillers may be used (including but not limited to sand or glass materials)) was slowly added, with constant mixing using a jiffy blade, for 5-10 min. Once the quartz was thoroughly wetted with the resin epoxy mixture, 35 g of the pasty mix was removed and spread on a Teflon sheet and dried in an oven at 80° C./40 min. The dried materials was lightly ground with a mortar and pestle into smaller clumps, and these were used to progressively fill a stick mold at 80-100° C., pressing down layer by layer. The mold was heated at 150° C. for 5 min and the mold lid was then placed on top of the mold. The material was then pressed under 12-13T of pressure at 150° C. for 90 minutes to cure. The final sample Barcol Hardness at room temperature was 70-80. Other temperatures, pressures, and/or cure times may be used as appropriate, based on the desired end characteristics, base ingredients, and/or amounts used.

Other example composites and curing processes, and example properties of the same, follow below in Table 3.

TABLE 3

| Ingredients | Formulation 1 | Formulation 2 |
|---|---|---|
| Quartz (100-315µ) | 65 g | 77.5 g |
| Acrylic Resin (with Acid Value of about 215 and a molecular weight of about 4,500 Daltons) | 6.5 g | 5.0 g |
| Epoxol ® 9-5 | 4.7 g | 3.6 g |
| Cure Temp. ° C./min | 150/90 | 150/90 |
| Flexural Strength (psi) | 7803 | 7736 |
| Barcol Hardness | 70-80 | 70-80 |

As illustrated by the examples, the composites may have a flexural strength of, for example, about 7700 psi or more. In other examples, the flexural strength may be about 1000 psi or more, about 2000 psi or more, about 3000 psi or more, about 4000 psi or more, 5000 psi or more, about 6000 psi or more, about 7000 psi or more, about 8000 psi or more, about 9000 psi or more, or about 10,000 psi or more.

Another example composite and curing process follows below in Table 4.

TABLE 4

| Ingredients | Amount |
|---|---|
| Quartz (100-315µ) | 86.7 g |
| Polyester Resin (Acid Value of about 351) | 6.3 g |
| Epoxol ® 9-5 | 3.4 g |
| Cure Temp. ° C./min | 150/90 |

The above table reflects an example of a stone composite application that is solvent based. A more detailed explanation of this example composition and an example process of making such a composite follows below.

In this example, a carboxyl functional polyester resin with an acid equivalent weight around 350 was synthesized using Cyclohexane dicarboxylic acid (CHDA), isophthalic acid, trimethylolpropane, 1,4 butane diol and neopentyl glycol at individual percent composition between 5-60%, using regular polyester synthesis procedure involving a tin based catalyst. The resin was cut in acetone to make a 76% resin solution. 8.3 g of the polyester resin solution was thoroughly mixed with 3.4 g of EVO with 9.5% oxirane content and 86.7 g of high purity quartz QS005F. The mixture was then dried @ 80° C./1 hr. The dry mixture was transferred to a mold where the material was compressed and heat cured under pressure at 150° C. for 90 minutes. The sample density on cooling to room temperature was 2.23 with a Barcol hardness of 65-70. The flexural strength of the sample according to ASTM method D 790 was 4219 psi.

With suitable choice of ingredients (for example, quartz granules of different sizes to obtain higher loading and compaction) and fabrication techniques other composites may have increased, or decreased, mechanical properties depending on the goals and requirements of the application.

Another example of a stone composite application utilizes EVO and a polyester resin. In an example, the composite includes 92.7 g of quartz filler (Hipu-QS005F), 2.3 g titanium dioxide R-700, 7.9 g Polyester Resin (acid equivalent weight of about 779 and a Tg of 57 C), 0.1 g Aerosil 200, and 1.9 g EVO (168 Eq. wt.). The cure time is 60 minutes, and the cure temperature is 150 degrees Celsius. This example has a water absorption of 0.03% in 24 hours, and a 0.1% water absorption in 7 days. The density is 2.34 g/cm$^3$. The Barcol hardness is 70-80, and the flexural strength was 10,300 psi.

Another example application is liquid coatings, for example when epoxy material(s) and resin materials(s) are dissolved in a solvent, such as an organic solvent, to form a liquid coating. The coatings may be high-solid liquid coatings. Example coating applications include use with steel coils or for automotive and/or industrial finishes. Compositions, such as binder compositions, may be pigmented or clear. In some examples, a binder composition or other composition may be dissolved, e.g. in a polar solvent, then then cured to give a high gloss, durable finish.

An example liquid coating embodiment follows below in Table 5.

TABLE 5

| Ingredients | Eq. wt | Amt (g) | % wt |
|---|---|---|---|
| Acrylic Resin (acid equivalent weight of about 260 and a molecular weight of about 4,500 Daltons) | 800 | 39.2 | 58.2 |
| Epoxol ® 9-5 | 171 | 28.1 | 41.8 |
| 2-Butoxyethanol (solvent) | | 20 | |
| Dipropylene Glycol Methyl Ether | | 5 | |
| Acetone | | 2.5 | Post-added |
| Irganox ® 1010 | | 0.11 | |
| BYK ®-019 | | 0.1 | |
| Alkyl Imidazole Catalyst | | 0.3 | |

In this example, the epoxidized linseed oil with 9.5 oxirane value was mixed with 20 g of 2-Butoxyethanol solvent and 5 grams of dipropylene glycol methyl ether, then 39.2 g of acrylic resin material was added (but other oils, resins, solvents, and amounts may be used). Then, 2.5 g of acetone and 0.4% of catalyst (alkyl imidazole) was added, and the mixture was mixed until clear (again, other solvents, catalysts, and amounts may be used). Then a defoamer (in this example, BYK®-019, commercially available from BYK USA Inc.) and an antioxidant (in this example, Irganox® 1010, commercially available from BASF Corporation) were added (again, in other examples, other defoamers and/or antioxidants, and amounts thereof (including none) may be used). A smooth film was then drawn down on cold rolled steel. The panel dried to 1.5-2.0 mils at room temperature overnight (but other thicknesses and drying times/conditions may be used, such as thickness of 0.3 mils or more, 0.5 mils or more, 0.75 mils or more, 1.0 mils or more, 2.0 mils or more, 3.0 mils or more, or 5.0 mils or more). The panel was then cured in the oven at about 150° C. for about 35 min (again, other times, temperatures, and conditions may be used). The cured coatings were clear with high gloss and had excellent hardness, impact resistance, and stain resistance, along with chemical resistance of 100 acetone double rubs (ADR) with no burnish.

Example coating compositions may exhibit excellent adhesion properties. Thus, besides the outstanding adhesion of the cured films to substrate(s), such as but not limited to metal substrate(s), other adhesive applications are possible. In one example a 0.5"×0.5"×2.5" acrylic/ELO quartz composite sample was intentionally fractured along its length in the center. The acrylic/ELO solvent based solution was applied to the fractured area. The solvent was then allowed to evaporate at 80° C. and the warm parts were rejoined under limited pressure to squeeze out excess adhesive. The sample was cured in the oven at 150° C. for 1 hour and then cooled. When tested for mechanical strength, the sample fractured at a different location at 1888 psi of force suggesting that the adhesive strength was stronger than the composite sample.

Another example liquid coating embodiment follows below in Table 6.

TABLE 6

| Ingredient | Eq Wt. | Amt(g) |
|---|---|---|
| Polyester Resin (acid equivalent weight of about 779 and a Tg of 57 C.) | 779 | 36.4 |
| ELO 9-5 | 168 | 8.4 |
| MEK | | 24.5 |
| BC | | 4.0 |
| Zinc phosphonium salt catalyst | | 0.5 |
| Irganox ® 1010 | | 0.2 |
| Total: | | 74 |

| Film properties |
|---|
| Film drawdown air dried overnight. |
| Cure Temp.: 150 C./1 hr. |
| 1N NaOH 24 hrs spot test: No effect |
| 2% H$_2$SO$_4$ 24 hrs spot Test: No effect |
| MEK double rubs: 200+ |
| Hardness: 3H |

In another example application, a composite may be a non-hazardous, solvent-free composite with a high degree of bio-renewable content (other examples may only have a subset of these properties, e.g. a solvent-free composite, or a non-hazardous composite). In other examples, the final composite is substantially solvent-free. In some examples, the degree of bio-renewable content is 0-50% by weight. In some examples, the degree is 5% by weight or more, 10% or more, 20%, 30%, 40%, 50%, or 60% or more.

In this example application, a resin binder matrix for stone composites may use one or more fillers such as glass, crystalline silica such as quartz or similar materials, titanium dioxide, carbon fiber, amorphous precipitated or fumed silica, ceramic, wood, or metals. In some examples of a non-hazardous composite, the composite is solvent free or has very low VOC mixture of carboxylic functional acrylic or polyester resin (e.g. a resin with MWt: 500-25000, AV: 50-275) and epoxidized oil or derivative with oxirane content 3.5-11.5%. In embodiments, the acrylate resin is a polymer formed from the free radical polymerization of monomers such as, but not limited to, styrene, MMA, BA BMA, acrylic acid, methacrylic acid, maleic anhydride, HEMA, HEA, and/or GMA(Glycidyl methacrylate) using, e.g., a free radical initiator. A polyester resin may be formed by the condensation reaction of carboxylic and hydroxyl groups. This type of polyester will have a high proportion of carboxylic groups and may contain hydroxyl groups. In some examples, the polyester has as few hydroxyl groups as possible, however. The epoxidized oil or its derivatives may contain oils, such C5-C26 aliphatic chains, which may have ester and internal epoxy groups.

Solvent free systems beneficially avoid air emissions and/or expensive solvent recovery equipment while the addition of a catalyst speeds curing times. A composite binder composition consisting of a derivative of an epoxidized oil that is thermally initiated and free radically cured and the binder components may have very low VOCs. These types of compositions are differentiated from conventional styrene based compositions where the reactive diluent is volatile and toxic. Other compositions may also have low VOCs.

In an example, a composition includes or consists of partially or fully acrylated epoxidized vegetable oil between 0-50% by weight, a multifunctional acrylate between 10-40% by weight as a reactive diluent, including but not limited to trimethylolpropane triacrylate or 1,4 butanediol diacrylate (BDDA), and a low molecular weight carboxylic functional acrylic or polyester resin between 10-50% by weight, with or without a liquid anhydride such as methyl hexahydrophthalic anhydride (mHHPA) between 0-30% by weight (where these illustrative weight ranges are for the relative amounts of these example components, and other components such as fillers would impact the overall weight percentages of a final product). The liquid components may act as a reactive diluent to assist in the application and wetting of the quartz or other fillers. The fillers and/or other additives may be added in various amounts, as illustrated by this disclosure. In an embodiment, after combining the mixture with a free radical initiator such as the thermal peroxide initiator Luperox® 101 and heat curing at 120-175° C., the result is a hard composite. Example compositions of this disclosure do not use any anhydride.

As another example, one that does not utilize a volatile solvent or volatile reactive diluent, the carboxylic or anhydride functional polyester resin, carboxylic functional acrylic resin, or polyacid (or other resin material(s)) is in dry powdered form. In this example, the powdered reactant remains suspended in the liquid EVO (or other epoxidized oils/derivatives). As the temperature of the mold is raised the powder melts, reacts, and fuses in the binder formulation to give a hard cured product. In some examples, a powder resin material(s) is used for the composition. In certain of embodiments, the particle size of a powdered resin is smaller than the particle size of any fillers (e.g. under 500 microns, or in a size ratio of about 1:10 or less or 1:5 or less of resin powder size to filler powder size). A low viscosity liquid epoxy material may be used (e.g. ELO or ESO) with the powdered resin, where this may be heated to help lower the viscosity to, e.g., 1000 cps or less, 800 cps or less, 600 cps or less, 500 cps or less, 300 cps or less, or 100 cps or less. The epoxy material may be added to the resin prior to the addition of fillers. The epoxy material may be added to wet the fillers, and then a powdered resin is added. The epoxy/resin/filler combination (however formed) may then be heated and/or compressed. This can provide a solvent-free composition such as a composite.

An example of a solvent free or very low VOC composition with ELO uses 5.0 g of acrylic resin with an approximate molecular weight of 1700, an acid equivalent weight of 235, and a Tg of around 55° C. was mixed with 5 g of BDDA and 5 g of HHPA and 10 g of Epoxol 9-5 having 9.5% oxirane groups to make a clear resin solution. The 10.8 g of the resin solution was then mixed with 0.06 g of 20% solution of Luperox 101 in acetone, 0.1 g of glycerol, along with 0.027 g of 50% solution of an alkyl imidazole catalyst in methyl ethyl ketone (MEK). To this, 89 g of Q005M quartz (particle size 0.1-0.7 mm) was added and mixed for 25 min. The quartz resin mixture was then transferred to a mold (0.5"×0.5"×2.5" cavity) at room temperature by packing it progressively layer after layer. The mold was closed with a pressure of 12 tons of force and heat was applied. The mold was kept under the pressure at 130° C. for 1 hour. The mold sample was removed and post cured at 150° C. for 1 additional hour. The sample was tested at room temperature and had a flexural strength of 4524 psi and density of 2.13 g/cm$^3$.

Another example, utilizing ELO and CHDA, includes 3.9 g of Cyclohexanedicarboxylic acid (CHDA) with an acid value around 652 from Eastman Chemical, 8.4 g of Epoxol 9-5 with 9.5% oxirane, and 49.2 g of Q005M quartz (particle size 0.1-0.7 mm). These ingredients are mixed thoroughly. The dough like mixture was transferred to a stick mold (0.5"×0.5"×2.5") cavity. The mold was closed with a pressure of 12 tons of force and heat was applied. The mold was kept under the pressure at 163° C. for 90 minutes. The sample was tested at room temperature and had a flexural strength of 2878 psi and a density of 2.08 g/cm$^3$.

Additional examples of solvent free, fine powder compositions, where these examples use Epoxol 7-4 and Epoxol 9-5, follow below in Table 7.

TABLE 7

| | Eq. Wt. | Epoxol 7-4 Compoistion | Epoxol 9-5 Compoistion |
|---|---|---|---|
| Ingredients | | | |
| Acrylic Resin (acid equivalent weight of about 260 and a molecular weight of about 4,500 Daltons) (fine powder) | 261 | 5.1 g | 7.8 |
| Epoxol 7-4 ESO | 222 | 4.4 g | — |
| Epoxol 9-5 ELO | 171 | — | 4.9 |
| Zinc phosphonium salt catalyst | | 0.2 g | 0.3 |
| Quartz, 0.1-0.71 mm (Q005M) | | 90.7 g | 100.4 |
| Titanium Dioxide (R-700) | | 1.7 g | 1.0 |
| Aerosil ® 200 Fumed Silica | | 0.8 g | |
| Acematt ® TS-100 Thermal Silica | | | 0.15 |
| Total: | | 102.9 g | 114.55 |
| Cure Temp/Time: ° C./min | | 155° C./35 min. | 150° C./45 min. |
| Properties | | | |
| Density | | 2.33 g/cm$^3$ | 2.31 g/cm$^3$ |
| Barcol Hardness | | 70-75 | 80-82 |
| Flexural strength (ASTM D790) | | 5404 | 7688 |

An example of an acrylated soybean oil based composite, made with free radical cure, is detailed below in Tables 8-10.

TABLE 8

Example Composite Binder Formulation

| Ingredient | Amt (g) |
| --- | --- |
| Carboxyl functional Acrylic resin (4,500 MWT, Tg 65° C.) | 2.5 |
| TMPTA (100%) | 3.0 |
| Ebecryl ® 5848 (Acrylated Epoxidized Soybean Oil) | 4.0 |
| ELO 9-5 | 1.5 |
| Zinc phosphonium salt catalyst | 0.1 |
| Luperox ® 101: 20% in MEK | 0.05 |
| Total | 11.15 |

TABLE 9

Example Composite Formulation

| Ingredient | Amt(g) |
| --- | --- |
| Quartz (Q005F) | 110 |
| TiO2 (R700) | 1.2 |
| Aerosil ® 200 | 0.4 |
| Binder formulation from Table 8 above | 11.1 |
| Total | 122.7 |
| Cure Temp/time: 150° C./60 min. | |

TABLE 10

| Properties Properties: | |
| --- | --- |
| Water absorption: | 1.3% in 24 hours |
| Barcol Hardness: | 70 |
| Density: | 2.20 g/cm$^3$ |
| Flexural Strength: | 1206 psi |

In another example application, aqueous coatings and/or adhesives may be prepared, for example when epoxy material(s) and resin material(s) are dispersed in water to form an aqueous coating dispersion. In some example, a dispersion includes stabilizing component. The stabilizing component may be a neutralizing component(s) that stabilizes the dispersion by neutralizing the dispersion. The neutralizing component(s) may include one or more inorganic bases of ammonia, sodium hydroxide, potassium hydroxide, one or more organic bases of triethylamime, dimethylethanol amine, one or more Lewis bases. The stabilizing component may be one or more anionic surfactants, one or more nonionic surfactants, one or more neutralizing components, or a combination of the same.

As one example, a high acid value acrylic (e.g. MW: 1000-50000) and EVO (% oxirane 3.5-11.5) system can also be dispersed in water to give low VOC systems suitable for coating or adhesive applications. The use of water based compositions has several advantages. For example, such systems have lower VOC levels, a reduced fire hazard compared to solvent based systems, lower worker exposure hazards, and faster dry time due to use of two phase systems. In some examples, the VOC content is about 5.0 Lb/Gal or less, about 4.0 Lb/Gal or less, about 3.5 Lb/Gal or less, about 3.0 Lb/Gal or less, or about 2.5 Lb/Gal or less. An acrylic resin may be mixed or partially reacted with the EVO (or other oil) or its derivatives (e.g. epoxidized alkyl ester) followed by mechanically and spontaneous dispersion in a basic aqueous solution assisted by the addition of a water miscible solvent. The solvent may be a higher boiling solvent like butyl cellosolve that can be also used to assist in film formation and final appearance, or may be a highly volatile solvent such as acetone which is later removed or stripped out after the mixture has been dispersed.

Upon film formation, EVO (or another oil, as this disclosure contemplates substitution or replacement of types of oils (e.g. EVO v. ELO) and/or or its types of oil) and/or its derivatives can act as a reactive diluent that may react by heat assisted curing to give highly durable films with a good appearance. The Tg and the acid value of the acrylic may be manipulated to give soft, hard, or tough impact resistant films. Suitable bases used for neutralizing include TEA (trimethylamine), DMAE (dimethylaminoethanol), and ammonia which can be pre-added to the resin or to the aqueous portion of the system. Heat and agitation may also be used for the dispersion process. The process allows for formulating compositions having smooth, high gloss films with or without solvent. The EVO can also act as a plasticizer to assist in film formation. The non-volatile solids content of these systems can be from 10-50% and result in films that can have high clarity and/or gloss.

Aqueous compositions may also be used for adhesive applications. The material may be coated to one substrate, or one or more surfaces of a substrate, and then air dried to form a tack free film. Another substrate can be subsequently placed on the film and the two parts may be adhered by heating and/or pressure to initiate the reaction between the carboxylic group and the oxirane groups and therefore curing the materials. This may result in a tough, heat resistant bond between the two surfaces. It may also allow large substrates and/or composite parts to be coated (partially or entirely) at one facility and cured at another. The non-hazardous nature of the application is advantageous in limiting worker exposure hazards. In some examples, an epoxy/resin composition is applied to one or more substrates in either liquid or paste form, and the one or more substrates are then joined to another substrate, and the joined substrates are heat cured to adhere the substrates together.

This approach is also suitable for example uses with water based acrylic latexes. For example, a composition consisting of a high acid value (e.g. AV: 25-250) aqueous acrylic latex (e.g. 100 parts), 2-20% of EVO, 2-20% of an EVO derivative such as epoxidized methyl soyate (EMS) or epoxidized methyl linseedate (EML), a catalyst, and a co-solvent (2-30%) may be air dried and thermally cured to give tough, solvent resistant crosslinked films with a high bio-renewable content. Other amounts, components, and/or proportions may also be used.

As one particular example, 9.4 g of EVO with 9.5% oxirane content was mixed in 25.5 g of acetone followed by addition of 40 g of a carboxyl functional acrylic resin (MW: 10,500, Tg of around 55, and carboxyl equivalent wt. around 800). The resin was dissolved over 2 hours to form a clear solution. The percent non-volatile was measured at around 72.5% due to a limited amount of solvent evaporation during the processing. A solution was prepared where 0.3 g of 50% ammonia was added to 10 g of water at around 60° C. To the ammonia solution, 10.5 g of the above resin mixture was added under good agitation. The resin spontaneously dispersed to form a translucent dispersion. Small amounts of additional water and ammonia were added to keep the solution basic. After warming, the acetone was then removed under vacuum conditions to give a stable dispersion with a pH of 7.37 and having 41% non-volatiles. Films drawn down on metal and glass were smooth and had high gloss, were well coalesced, and produced clear, fast drying, and tack free films. The films were then heat cured at 150° C. for one hour to give hard, high gloss films.

As another example, Epoxol 9-5 and carboxyl functional acrylic resin (MW: 10,500, Tg of around 55, and carboxyl equivalent wt. around 800) were formulated into solvent based white and black pigmented coatings (in other examples, other pigments, dyes and/or colors may be used), along with top coat formulations pigmented white and black as controls. In these examples, a titanium dioxide was used as the white pigment, at a level of 20% PVC, and a carbon black pigment dispersion was used in an about of 1.5% PVC. Other amount of dyes/pigments/colorants may be used (e.g. 3.0% carbon black dispersion). The formulations were drawn down on steel test panels and heat cured at 160° C. for 60 minutes. Example control compositions and disclosure embodiments follow below in Tables 11-14. The acrylic-melamine control paints were formulated at a 70/30 polyol/melamine resin solids ratio catalyzed with 0.25% blocked p-TSA catalyst on solids. The test example acid-epoxy paints were formulated at a 58/42 acid/epoxy resin solids ratio catalyzed with 1.8% zinc phosphonium salt catalyst, supplied by ACS Technical Products.

TABLE 11A

Control White Pigmented Joncryl 500 and Cymel 303 Top Coat

| Step | Ingredients & Instruction | Quantity(lbs.) | % Wt. | % Vol. |
|---|---|---|---|---|
| 1. GRIND | BASF Joncryl 500 | 303.45 | 26.99 | 35.3 |
| | Methyl n-Amyl Ketone (MAK) | 42.04 | 3.74 | 6.18 |
| | Add enough MAK to achieve good vortex then slowly add: | | | |
| | BYK Additives Disperbyk 180 | 8.03 | 0.71 | 0.89 |
| | Chemours Ti-Pure R-706 | 398.55 | 35.46 | 11.94 |
| | MAK | 0.00 | 0.00 | 0.00 |
| | Add enough MAK to achieve good vortex & grind on HSD to 7+ Hegman | | | |
| 2. LETDOWN | BASF Joncryl 500 | 89.69 | 7.98 | 10.43 |
| | Allnex Cymel 303 LF resin | 135.09 | 12.02 | 13.49 |
| | Premix next 3 ingredients & add: | | | |
| | n-Butanol | 33.82 | 3.01 | 5.00 |
| | King Industries Nacure 2500 | 4.48 | 0.40 | 0.55 |
| | BYK Additives BYK-358N | 5.42 | 0.48 | 0.68 |
| | Reduce viscosity to 70-75 KU with the following: | | | |
| | Methyl isobutyl ketone (MIBK) | 103.52 | 9.21 | 15.52 |
| TOTALS | | 1,124.10 | 100% | 100% |

TABLE 11B

Properties of Table 11A Composition

| Physical Properties | Calculated Value |
|---|---|
| % PVC | 19.99 |
| % Weight Solids | 76.13 |
| % Volume Solids | 60.45 |
| Specific Gravity (g/cm3) | 1.347 |
| Weight/gallon (Lb/gal) | 11.24 |
| VOC (Lb/Gal) | 2.68 |
| VOC (g/L) | 321.6 |

TABLE 12A

Test White Pigmented Epoxol 9-5 and Acrylic Resin Topcoat

| Item Code | Ingredients & Instruction | Quantity(lbs.) | % Wt. | % Vol. |
|---|---|---|---|---|
| 1. GRIND | Acrylic Resin (4,500 MWT, Tg 66, Carboxyl Eq. Wt. 260) in MEK (64.7%) | 210.61 | 20.87 | 24.50 |
| | MEK | 29.31 | 2.90 | 4.37 |
| | Add enough MEK to achieve good vortex then slowly add: | | | |
| | BYK Additives Disperbyk 180 | 5.83 | 0.58 | 0.65 |
| | Chemours Ti-Pure R-706 | 292.29 | 28.97 | 8.76 |
| | MEK | 41.68 | 4.13 | 6.21 |
| | Add enough MEK to achieve good vortex & grind on HSD to 7+ Hegman | | | |
| 2. LETDOWN | Acrylic Resin (4,500 MWT, Tg 65, Carboxyl Eq. Wt. 215) | 62.93 | 6.24 | 7.32 |
| | Epoxol 9-5 ELO | 126.98 | 12.58 | 14.77 |
| | Premix next 3 ingredients & add | | | |

TABLE 12A-continued

Test White Pigmented Epoxol 9-5 and Acrylic Resin Topcoat

| Item Code | Ingredients & Instruction | Quantity(lbs.) | % Wt. | % Vol. |
|---|---|---|---|---|
| | Dow Chemical Dowanol DPM | 26.12 | 2.59 | 3.29 |
| | Zinc phosphonium salt catalyst | 5.56 | 0.55 | 0.67 |
| | BYK Additives BYK-358N | 4.31 | 0.43 | 0.54 |
| | Reduce viscosity to 70-75 KU with the following: | | | |
| | Eastman Glycol Ether EB | 86.76 | 8.60 | 11.53 |
| | MEK | 116.72 | 11.57 | 17.40 |
| TOTALS | | 1,009.10 | 100% | 100% |

TABLE 12B

Properties of Table 12A Composition

| Physical Properties | Calculated Value |
|---|---|
| % PVC | 19.98 |
| % Weight Solids | 60.32 |
| % Volume Solids | 44.98 |
| Specific Gravity (g/cm3) | 1.209 |
| Weight/gallon (Lb/gal) | 10.09 |
| VOC (Lb/Gal) | 4.0 |
| VOC (g/L) | 479.8 |

TABLE 13

Control Black Pigmented Joncryl 500 and Cymel 303 Top Coat

| Item Code | Ingredients & instruction | Quantity(lbs.) | % Wt. | % Vol. |
|---|---|---|---|---|
| 1. MIX | BASF Joncryl 500 | 477.3 | 56.4 | 55.5 |
| | Allnex Cymel 303 LF Resin | 165.4 | 19.5 | 16.5 |
| | MAK | 51.3 | 6.1 | 7.5 |
| | Slowly add colorant and mix thoroughly: | | | |
| | Chromaflo Technologies Chroma-Chem 844-9956 | 66.3 | 7.8 | 7.8 |
| 2. LETDOWN | Premix next 3 ingredients & add: | | | |
| | n-Butanol | 28.9 | 3.4 | 4.3 |
| | King Industries Nacure 2500 | 5.22 | 0.6 | 0.6 |
| | BYK Additives BYK-358N | 3.32 | 0.4 | 0.4 |
| | Reduce viscosity to 70-75 KU with the following: | | | |
| | MIBK | 48.7 | 5.8 | 7.3 |
| TOTALS | | 846.3 | 100% | 100% |

TABLE 13B

Properties of Table 13A Composition

| Physical Properties | Calculated Value |
|---|---|
| % PVC | 1.56 |
| % Weight Solids | 68.04 |
| % Volume Solids | 60.61 |
| Specific Gravity (g/cm3) | 1.014 |
| Weight/gallon (Lb/gal) | 8.46 |
| VOC (Lb/Gal) | 2.7 |
| VOC (g/L) | 324.1 |

TABLE 14

Test Black Pigmented Epoxol 9-5 and Acrylic Resin Topcoat

| Item Code | Ingredients & Instruction | Quantity(lbs.) | % Wt. | % Vol. |
|---|---|---|---|---|
| 1. GRIND | Acrylic Resin (4,500 MWT, Tg 66, Carboxyl Eq. Wt. 260) in MEK (64.7%) | 383.8 | 46.9 | 44.7 |
| | Epoxol 9-5 ELO | 178.2 | 21.7 | 20.7 |
| | MEK | 42.6 | 5.2 | 6.4 |
| | Slowly add colorant and mix thoroughly: | | | |
| | Chromaflo Technologies Chroma-Chem 844-9956 | 54.8 | 6.7 | 6.4 |
| 2. LETDOWN | Premix next 3 ingredients & add: | | | |
| | Dow Chemical Dowanol DPM | 38.6 | 4.7 | 4.9 |
| | Zinc phosphonium salt catalyst | 7.76 | 0.9 | 0.9 |
| | BYK Additives BYK-358N | 3.11 | 0.4 | 0.4 |
| | Reduce viscosity to 70-75 KU with the following: | | | |
| | MEK | 64.9 | 7.9 | 9.7 |
| | Eastman Glycol Ether EB | 45.1 | 5.5 | 6.0 |
| TOTALS | | 818.8 | 100% | 100% |

TABLE 14B

Properties of Table 14A Composition

| Physical Properties | Calculated Value |
|---|---|
| % PVC | 1.52 |
| % Weight Solids | 56.16 |
| % Volume Solids | 52.12 |
| Specific Gravity (g/cm3) | 0.981 |
| Weight/gallon (Lb/gal) | 8.19 |
| VOC (Lb/Gal) | 3.6 |
| VOC (g/L) | 430.1 |

Test Results for these compositions follow below in Tables 16 (white coatings) and 17 black coatings). The four coatings were applied to metal panels via wire wound rod application, allowed to set under ambient conditions for one hour then baked for one hour at 160° C. with a 15-minute temperature ramp-up time. Three different metal substrates were used including cold rolled steel, Bonderite 1000 phosphated steel and untreated aluminum. The panels yielded 1.0-1.3 mils dry film thickness. Panels were tested for adhesion, hardness, solvent and chemical resistance, flexibility and impact resistance according to Table 15.

TABLE 15

Test Protocols

| Physical Property Tests | Test Method | Aluminum | CRS | Phos CRS |
|---|---|---|---|---|
| Adhesion | ASTM D3359 | X | X | X |
| Chemical Resistance | ASTM D1308 | | X | |
| Flexibility by Conical Mandrel | ASTM D522 | | X | |
| Flexibility by T-Bend | ASTM D4145 | X | | |
| Gloss | ASTM D523 | X | | |
| Hardness (Pencil) | ASTM D3363 | | X | |
| Impact Resistance | ASTM D2794 | | X | |
| MEK Resistance | ASTM D4752 | | X | |

TABLE 16

Detailed Test Results of White Coatings

| Physical Property | Test Method | Substrate | Control White Baking Enamel | Test White Baking Enamel |
|---|---|---|---|---|
| Cure Schedule | | | 60' @ 160° C. | 60' @ 160° C. |
| Average DFT (mils) | | | 1.0-1.2 | 1.0-1.3 |
| Adhesion | ASTM D3359 | CRS | 4A-5A* | 5A |
| | | | 4A-5A* | 5A |
| Adhesion | ASTM D3359 | Phos CRS | 5A | 5A |
| | | | 5A | 5A |
| Adhesion | ASTM D3359 | Aluminum | 3A | 5A |
| | | | 3A | 5A |
| Hardness (Pencil) | ASTM D3363 | CRS | >6H | >6H |
| MEK Resistance | ASTM D4752 | CRS | >200 | >200 |
| | | | >200 | >200 |
| Gloss - 20° | ASTM D523 | Aluminum | 59.2 | 81.5 |
| Gloss - 60° | | | 79.0 | 94.4 |
| Gloss - 85° | | | 96.9 | 97.9 |
| Chemical Resistance - 16-Hour Spot ** | | | | |
| 10% Sulfuric Acid | ASTM D1308 | CRS | 5 | 5 |
| Xylene | | | 5 | 5 |
| Isopropyl Alcohol | | | 5 | 5 |
| Water | | | 5 | 5 |
| Flexibility by Conical Mandrel Bend | ASTM D522 | CRS | Fail ¾" | Pass ⅛" |
| Flexibility by T-Bend | ASTM D4145 | Aluminum | Fail 6T | Fail 6T |

TABLE 16-continued

Detailed Test Results of White Coatings

| Physical Property | Test Method | Substrate | Control White Baking Enamel | Test White Baking Enamel |
|---|---|---|---|---|
| Impact Resistance | | | | |
| Direct | ASTM D2794 | CRS | 20 Fail/ 15 Pass | 80 Fail/ 70 Pass |
| Reverse | | | 5 Fail | 60 Fail/ 50 Pass |

*Coating chatters slightly upon scribing (Brittle)
** Observations - Severity Ratings: 5 = No effect, 4 = Slight Effect, 3 = Moderate Effect, 2 = Severe Effect, 1 = Total Failure; Failure Modes: BL = Blistering, DL = Delamination

TABLE 17

Detailed Test Results of Black Coatings

| Physical Property | Test Method | Substrate | Control Black Baking Enamel | Test Black Baking Enamel |
|---|---|---|---|---|
| Cure Schedule | | | 60' @ 160° C. | 60' @ 160° C. |
| Average DFT (mils) | | | 1.0-1.2 | 1.0-1.3 |
| Adhesion | ASTM D3359 | CRS | 0A * 0A * | 5A 5A |
| Adhesion | ASTM D3359 | Phos CRS | 0A * 0A * | 5A 5A |
| Adhesion | ASTM D3359 | Aluminum | 0A * 0A * | 4-5A 4-5A |
| Hardness (Pencil) | ASTM D3363 | CRS | B | >6H |
| MEK Resistance | ASTM D4752 | CRS | 200 197 | 99 104 |
| Gloss - 20° | ASTM D523 | Aluminum | 90.3 | 90.3 |
| Gloss - 60° | | | 97.2 | 94.1 |
| Gloss - 85° | | | 95.5 | 98.2 |
| Chemical Resistance - 16-Hour Spot ** | | | | |
| 10% Sulfuric Acid | ASTM D1308 | CRS | 5 | 5 |
| Xylene | | | 1DL | 5 |
| Isopoply Alcohol | | | 5 | 5 |
| Water | | | 5 | 5 |
| Flexibility by Conical Mandrel Bend | ASTM D522 | CRS | Fail 1½" | Pass ⅛" |
| Flexibility by T-Bend | ASTM D4145 | Aluminum | Fail 6T | Fail 6T |
| Impact Resistance | | | | |
| Direct | ASTM D2794 | CRS | 5 Fail | 70 Fail/ 60 Pass |
| Reverse | | | 5 Fail | 80 Fail/ 70 Pass |

* Coating chatters slightly upon scribing (Brittle)
** Observations - Severity Ratings: 5 = No effect, 4 = Slight Effect, 3 = Moderate Effect, 2 = Severe Effect, 1 = Total Failure; Failure Modes: DL = Delamination, GL = Gloss Loss For the white coatings, both the control and test coating showed good adhesion to steel and phosphated steel, excellent hardness, acid, water and MEK resistance. The test coating was superior to the control in adhesion over aluminum, flexibility and impact resistance. The test coating also showed higher 20° and 60° gloss than the control.

For the black coatings, both the control and the test coating showed excellent gloss, acid, alcohol and water resistance. The test coating was superior to the control in adhesion to all substrates, hardness, flexibility and impact resistance. What's more, the black control coating showed severe adhesion loss when applied directly to the substrates when compared to the test coating.

In sum, the test coatings had good gloss, adhesion, hardness, MEK, acid and water resistance, mandrel bend flexibility and impact resistance.

Another example of a black coating composition follows below in Table 18.

TABLE 18

| Item Code | Ingredients & Instruction | Quantity(lbs.) | % Wt. | % Vol. |
|---|---|---|---|---|
| 1. GRIND | Acrylic Resin (4,500 MWT, Tg 66, Carboxyl Eq. Wt. 260) in MEK (64.7%) | 359.17 | 43.77 | 41.78 |
| | Epoxol 9-5 ELO | 166.89 | 20.34 | 19.41 |
| | MEK | 39.89 | 4.86 | 5.94 |
| | Slowly add colorant and mix thoroughly: | | | |
| | Chromaflo Technologies Chroma-Chem 844-9956 | 102.54 | 12.50 | 12.05 |
| 2. LETDOWN | Premix next 3 ingredients & add: | | | |
| | Dow Chemical Dowanol DPM | 35.94 | 4.38 | 4.53 |
| | Zinc phosphonium salt catalyst | 7.15 | 0.87 | 0.86 |
| | BYK Additives BYK-358N | 5.83 | 0.71 | 0.74 |
| | Reduce viscosity to 70-75 KU with the following: | | | |
| | MEK | 60.96 | 7.43 | 9.09 |
| | Eastman Glycol Ether EB | 42.23 | 5.15 | 5.61 |
| TOTALS | | 826.60 | 100% | 100% |

As another example, amino resins, such as Cymel® 303, may also be added to composition (such as a binder composition) containing a carboxyl functional resin (acrylic or polyester) to react with the hydroxyl groups generated from the epoxy ring opening to form a thermoset composition. Similarly, Polyisocyanates, isocyanate terminated prepolymers, or blocked isocyanate version of the polyisocyanate or prepolymers, may also be included in the formulations. The amount (e.g. 5-40% by wt.) may be based on the equivalent levels of epoxy groups in the formulation. EVO derivative adducts with poly isocyanates may also be prepared by reacting the EVO containing hydroxyl groups. The isocyanate can be aromatic or aliphatic, including but not limited to MDI or H12MDI or IPDI.

For a particular example of the above compositions, a carboxyl functional acrylic was first dissolved in MEK followed by addition of EVO, Cymel® 303 and a catalyst. The formulation was stirred continuously for 1 hr. and allowed to sit overnight. Films were drawn on cold rolled steel (CRS) followed by air drying for 1 hr. and placed in oven to cure at 150 Celsius for 55 min. The coating was tested for performance and had excellent hardness, stain, solvent and chemical resistance along with high clarity and gloss. Composition and property information are provided below in Table 19.

TABLE 19

| Ingredients | Wt (g) |
| --- | --- |
| Acrylic resin (4,500 Mwt, Tg 66° C., AV: 215 | 6 |
| EVO (Epoxy eq. wt: 170) | 3.9 |
| Cymel 303 LF (Allnex) | 2.2 |
| Zinc-Phosphonium salt (catalyst) | 0.2 |
| MEK | 10.2 |
| Total (% NV: 54.7%) | 22.5 |
| Cure: 150 C./55 min | |
| MEK DR | 200+ |
| Sharpie Marker Stain | No effect |
| NaOH (10%) overnight, 24 hrs | No effect |
| Hardness | 6H |
| Film Clarity | clear |

In another example applications, solvent free epoxidized vegetable oil (or other oil) based powder coating systems with tough, chemically resistant properties may be prepare for use on, e.g., metal substrates. These may also be utilized on other materials such as, but not limited to, encapsulating engineered wood (MDF).

Conventional powder systems generally have virtually no volatiles released. However, the use of bisphenol-A based epoxy resins in the hybrid powder systems result in coatings that yellow and chalk greatly on UV exposure. The widely used triglycidyl isocyanurate (TGIC) crosslinker is also toxic and classified as a Category 2 mutagen.

An acid value of less than 50 may limit the amount of the epoxy component that can be incorporated into the powder coating. A high acid value of the carboxylic functional resin gives increased crosslink density, toughness, chemical and water resistance, impact resistance, and other desirable properties such as gloss for coatings as well as composites. On the other hand, a higher level of epoxidized vegetable oil (EVO) introduces tackiness in the powder coating formulation making it less practical for the application of powder coatings.

In some examples, the EVO can be partially reacted with a carboxyl functional molecule that can be either a polyester, an acrylic, or a polycarboxylic acid molecule like phthalic acid or similar molecules, to give compositions suitable for high performance powder coating applications. By partially reacting the acrylic resin and opening up the epoxy groups in the EVO, it is possible to advance the molecular weight and the physical state thereby reducing the plasticizing effect of the EVO thus allowing the use as a higher performing powder coating system.

The system may also be blended with glycidyl based acrylics in stoichiometric amounts to optimize the performance for appropriate applications. The optimized combination of glycidyl methacrylate (GMA) based acrylics with carboxyl functional acrylics with acid values greater than 50, and partially reacted EVO, may be used in powder coating applications. This may reduce costs by elimination of expensive long chain diacid crosslinkers such as dodecanedioic acid, as well as reducing the amount of GMA based acrylics in the system. These types of formulations may be used in applications such as automotive clear coats and specifically for automotive alloy wheels. The higher level of functionality from the epoxidized vegetable oil will give improved performance without causing film brittleness or chipping, for example from gravel and stones.

As one particular example, a partially reacted EVO and acrylic resin powdered clear coat is prepared. In this example, 0.8 g of cyclohexanedicarboxylic acid (CHDA) was mixed with 9.2 g of Epoxol 9-5 ELO with 9.5% oxirane groups at 150° C. for 10 minutes. Next, 11.2 g of carboxyl functional acrylic resin with a molecular weight around 4,500 and an acid value of around 215 and a Tg around 65° C. were added to the reactants and further mixed for 5 minutes at 130° C. The resin mixture was then cooled below −15° C. and broken down to smaller pieces. After the addition of 0.2 g of fine fumed silica powder to the resin pieces, the mixture was pulverized in a grinder into fine powder. The resulting powder was filtered using a #80 sieve. The filtered powder was evenly spread onto a 6"×4" steel plate. Then the plate was baked in an oven at 175° C. for 45 minutes. The particles fused to form a clear, hard film with good gloss. The film was highly chemically resistant and able to withstand more than 200 MEK double rubs without blemish.

As discussed above, the compositions, formulation, and composites may be used in various systems and applications. For example, a component may be partially or entirely covered in a composite (e.g. a composite piece or pieces are adhered, or attached), or may be coated in the composite precursor and then the composite is cured on the component. In another example, an adhesive material may be interposed between two components. In yet another example, a composite may be formed into a piece having appropriate dimensions for incorporation into a device or structure.

In some aspects, the disclosure relates to a composite, where in examples the composite comprises one or more epoxidized oils and one or more resin materials including carboxylic functionality. In some examples, the one or more epoxidized oils comprise linseed oil, vegetable oil, soybean oil, or a combination thereof. In certain embodiments, the one or more epoxidized oils are derived from one or more plant based raw materials. In various examples, the one or more resin materials comprise an acrylic resin, a polyester resin, or a combination thereof. In certain embodiments, the composite further comprises one or more fillers. In various examples, the one or more fillers comprise quartz granules, marble granules, or a combination thereof. In some embodiments, the fillers have a size range of 0.2-500 μm.

In various examples of these aspects, the one or more oils and one or more resin materials are cured into a hard, durable composite. In some embodiments, the one or more resin materials have molecular weight of about 600-15,000 Daltons. In certain examples, the one or more epoxidized oils are between 10-70% of the composite, by weight, between 10-50% of the composite, by weight, between 15-45% of the composite, by weight, and/or between 35-45% of the composite, by weight. In certain examples, the composite has a Barcol Hardness of 70 BU-80 BU, a Barcol Hardness of 70 BU or more, and/or a Barcol Hardness of 80 BU or more. In some examples, the composite further comprises one or more UV stabilizers, one or more thixotropic binders, one or more processing aids, or a combination thereof. In certain examples, the one or more processing aids comprise one or more solvents, or optionally, the processing aid is used during in a step of forming the composite, but is then removed or dried off prior to curing the components into a composite.

In other aspects, the disclosure relates to process, in examples a process comprising heating one or more epoxidized oils, one or more resin materials including carboxylic functionality above the glass transition temperature of the one or more resin materials and mixing the heated one or more oils and one or more materials to form a mixture, and curing the mixture to form a composite. In some examples, one or more fillers are heated and mixed with the one or more oils and one or more materials. In certain examples, one or more solvents are heated and mixed with the one or more oils and one or more materials.

These materials, compositions, formulations, systems and process descriptions are merely examples. In certain embodiments, the materials, compositions, formulations, systems include additional combinations and/or substitutions of some or all of the features, materials, and/or components described above. Moreover, additional and alternative suitable variations, forms and components for the materials, compositions, formulations, and systems will be recognized by those skilled in the art given the benefit of this disclosure. Any of the features or materials described herein regarding materials, compositions, composites, formulations, or systems (such as but not limited to devices or components partially or entirely coated in one of the above compositions), may be utilized or incorporated into other materials, compositions, composites, formulations, or systems. For example, materials and/or properties described in reference to a composite may be utilized or present in an adhesive.

This disclosure also merely provides examples of the processes and/or process steps that may be performed in one or more embodiments, and additional and alternative suitable variations, steps, and combinations of steps will be recognized by those skilled in the art given the benefit of this disclosure. Finally, any of the features discussed in the example embodiments of the processes may be features of embodiments of the materials, compositions, formulations, systems (or components thereof), and vice versa.

What is claimed is:

1. A composition comprising:
   an epoxy material, wherein the epoxy material comprises at least one epoxidized vegetable oil or epoxidized vegetable oil derivative, and wherein the epoxy material has an oxirane percentage between 5.0-11.5 and comprises aliphatic chains; and
   a resin material, wherein the resin material comprises at least one carboxylic acid functional acrylic resin polymer or polyester resin polymer with free reactive carboxylic acid groups and does not comprise airy anhydride functionality, wherein the resin material has a Tg of 30° C.-90° C., wherein the acrylic resin polymer comprises a polymer backbone comprising aliphatic monomers, wherein the polyester resin polymer comprises a polymer backbone comprising aliphatic monomers, and wherein the resin material has an acid value in a range of 50-350;
   wherein the composition is a cured, thermoset material with cross-linking structures between the epoxy and resin materials;
   wherein the cross-linking structures comprise esters formed from a reaction of carboxylic acids of the resin material and oxirane groups of the epoxy material; and
   wherein the epoxy is material is present in an amount of 10% or more, by weight, of a total combined weight of the epoxy material and the resin material, and wherein the resin material is present in an amount of 50% or more, by weight, of the total combined weight of the epoxy material and the resin material.

2. The composition of claim 1, wherein the composition maintains a non-yellowed appearance when exposed to ultraviolet light.

3. The composition of claim 1, wherein the resin material comprises a molecular weight in a range of 500-25,000 Daltons and a ratio of oxirane to carboxylic groups of 0.9-1.5.

4. The composition of claim 1, wherein the cross-linking structures have chemical and water resistance such that the composition shows no effect after sixteen hours of exposure to any of xylene, isopropyl alcohol, or water, as determined by standard test method ASTM D1308.

5. A process comprising:
   combining and heating (a) an epoxy material comprising at least one epoxidized vegetable oil or epoxidized vegetable oil derivative and (b) a resin material comprising at least one carboxylic acid functional acrylic resin polymer or polyester resin polymer with free reactive carboxylic acid groups, above a glass transition temperature of the resin material to provide a mixture; and
   curing the mixture at an elevated temperature to initiate a reaction between the carboxylic acid groups and the epoxy and provide a cured, thermoset material with cross-linking structures between the epoxy and resin materials;
   wherein the cross-linking structures comprise esters formed from a reaction of carboxylic acids of the resin material and oxirane groups of the epoxy material;
   wherein the resin material does not comprise any anhydride functionality;
   wherein the acrylic resin polymer comprises a free radically derived polymer backbone comprising aliphatic monomers, and wherein the acrylic resin acid functionality is derived from unsaturated acid functional monomers with pendant carboxylic groups;
   wherein the polyester resin polymer comprises a polymer backbone comprising aliphatic monomers, and wherein the free reactive carboxylic acid groups in the polyester resin polymer are formed by a condensation reaction using excess difunctional polyacid compounds, excess trifunctional polyacid compounds, or excess difunctional and excess trifunctional polyacid compounds;
   wherein the epoxy material has an oxirane percentage between 5.0-11.5 and comprises aliphatic chains;
   wherein the resin material has an acid value in a range of 50-350; and
   wherein the epoxy material is present in an amount of 10% or more, by weight, of the total combined weight of the epoxy material and the resin material, and wherein the resin material is present in an amount of 50% or more, by weight, of the total combined weight of the epoxy material and the resin material.

6. The process of claim 5, wherein the thermoset material is thermally cured at a temperature of 140° C. or more.

7. The composition of claim 1, further comprising one or more fillers.

8. The composition of claim 7, wherein the one or more fillers comprise quartz granules, marble granules, carbon fibers, carbon tubes, glass or glass fibers, silica, ceramic, or a combination thereof.

9. The process of claim 5, wherein the mixture is processed into a powder form, and wherein the powder has a particle size of 10-200 μm.

10. The process of claim 9, wherein the powdered mixture is coated onto a substrate and then cured to form a thermoset coating.

11. The process of claim 5, wherein the resin material is combined with the epoxy material as well as one or more fillers prior to the curing, wherein the epoxy material is a liquid, wherein the resin material is in a powdered form when combined with the epoxy material and one or more fillers, and wherein the curing provides a solvent-free thermoset composite material.

12. The process of claim 5, wherein the epoxy material and the resin material are dissolved in an organic solvent to form a liquid coating prior to curing.

13. The process of claim 5, wherein the epoxy material and the resin material are dispersed in water to form an aqueous coating dispersion prior to curing.

14. The process of claim 13, wherein the dispersion comprises a stabilizing component that comprises one or more inorganic bases of ammonia, sodium hydroxide, potassium hydroxide, one or more organic bases of triethylamime, dimethylethanol amine, one or more Lewis bases, one or more anionic surfactants, one or more nonionic surfactants, or a combination thereof.

15. The composition of claim 1, wherein the composition is a pigmented or clear coating.

16. The process of claim 12, wherein the liquid coating is applied to one or more metal, wood, glass, or plastic substrates prior to curing.

17. The process of claim 5, wherein the epoxy material is derivatized by partially reacting the oxirane functionality with poly carboxyl functional oligomers, polyacid compounds, or a combination thereof.

18. The composition of claim 1, wherein the epoxy material is partially or fully acrylated, wherein the composition further comprises a liquid poly unsaturated multifunctional acrylate or vinylic compound, and wherein the composition is cured by a thermally initiated curing process using a peroxide initiator.

19. The composition of claim 18, wherein the composition further comprises one or more amino resins in an amount that is less than or equal to the epoxy equivalent levels.

20. The composition of claim 1, wherein the composition further comprises one or more amino resins in an amount that is less than or equal to the composition's epoxy equivalent levels.

21. The composition of claim 18 wherein the composition further comprises a polyisocyanate material, a blocked polyisocyanate material, an isocyanate blocked prepolymer material, an isocyanate terminated prepolymer material, a urethane adduct formed by a reaction of isocyanate groups and hydroxyl groups formed by the epoxy, or a combination thereof.

22. The composition of claim 1, wherein the composition further comprises one or more UV stabilizers, one or more thixotropic binders, one or more processing aids, or a combination thereof.

23. The composition of claim 1, wherein, when the composition has an adhesive strength sufficient to maintain structural integrity of the composition when exposed to a force of at least 1000 psi.

24. The composition of claim 1, wherein the epoxy material is combined with an anhydride or carboxyl functional polybutadiene having a molecular weight of 500 to 10,000 Daltons.

25. The process of claim 5, wherein the thermoset material is cured using an organometallic catalyst, a nitrogen containing catalyst, an alkaline metal compound catalyst, a phosphate salt catalyst, a toluene sulfonic acid derivative catalyst, an alkaline metal halide catalyst, a quaternary ammonium catalyst, an organic catalyst, an amine catalyst, a boron complex catalyst, or a combination thereof.

26. The process of claim 5, wherein one or more fillers are mixed with the epoxy material and the resin material.

* * * * *

UNITED STATES PATENT AND TRADEMARK OFFICE
CERTIFICATE OF CORRECTION

PATENT NO. : 10,513,566 B2
APPLICATION NO. : 16/014781
DATED : December 24, 2019
INVENTOR(S) : Kamlesh G. Mody et al.

It is certified that error appears in the above-identified patent and that said Letters Patent is hereby corrected as shown below:

On the Title Page

References Cited (56), OTHER PUBLICATIONS, Line 7:
Please delete "diglycidly" and insert --diglycidyl--

In the Specification

Column 2, Line 33:
Please delete "may" and insert --may have--

Column 3, Line 13:
Please delete "formation" and insert --formulation--

Column 5, Line 31:
Please delete "expoisized" and insert --epoxidized--

Column 7, Line 6:
Please delete "ultimate" and insert --ultimately the--

Column 15, Line 44:
Please delete "formation" and insert --formulation--

In the Claims

Column 33, Claim 1, Line 66:
Please delete "airy" and insert --any--

Signed and Sealed this
Sixteenth Day of June, 2020

Andrei Iancu
*Director of the United States Patent and Trademark Office*